US008826637B2

(12) United States Patent
Thies

(10) Patent No.: US 8,826,637 B2
(45) Date of Patent: Sep. 9, 2014

(54) ARRANGEMENT FOR THE DISCHARGE OF OIL-VENTING AIR ON A GAS-TURBINE ENGINE

(75) Inventor: Robert Thies, Schwielowsee (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 932 days.

(21) Appl. No.: 12/973,114

(22) Filed: Dec. 20, 2010

(65) Prior Publication Data

US 2011/0146224 A1    Jun. 23, 2011

(30) Foreign Application Priority Data

Dec. 21, 2009   (DE) .......................... 10 2009 059 019

(51) Int. Cl.
| | |
|---|---|
| F01D 11/00 | (2006.01) |
| F04D 29/06 | (2006.01) |
| F16J 15/00 | (2006.01) |
| F01D 25/18 | (2006.01) |
| F01D 25/22 | (2006.01) |
| F02C 7/28 | (2006.01) |
| F02K 1/78 | (2006.01) |
| F01D 25/00 | (2006.01) |
| F02C 7/06 | (2006.01) |
| F01M 13/04 | (2006.01) |

(52) U.S. Cl.
CPC . *F02C 7/06* (2013.01); *F01D 25/18* (2013.01); *Y02T 50/675* (2013.01); *F01M 2013/0433* (2013.01); *F01D 25/002* (2013.01); *F05D 2260/607* (2013.01)
USPC ........... 60/39.08; 60/770; 184/6.11; 415/112; 415/229

(58) Field of Classification Search
USPC ......... 60/770, 39.08; 184/6.11; 415/110–112, 415/122.1, 175, 176, 229
See application file for complete search history.

(56) References Cited

U.S. PATENT DOCUMENTS 3,170,292 A * 2/1965 Howes et al. ................ 60/39.08
3,722,624 A * 3/1973 Buckland .................... 184/6.11
(Continued)

FOREIGN PATENT DOCUMENTS

| DE | 3605619 | 8/1987 |
|---|---|---|
| DE | 69909541 | 5/2004 |

(Continued)

OTHER PUBLICATIONS

European Search Report dated Nov. 6, 2013 for counterpart Eurpoean Application No. 10 19 2540.2.

(Continued)

*Primary Examiner* — William H Rodriguez
*Assistant Examiner* — Karthik Subramanian
(74) *Attorney, Agent, or Firm* — Timothy J. Klima; Shuttleworth & Ingersoll, PLC

(57) ABSTRACT

In an arrangement for discharging oil-venting air (oil air) separated by a lubricating oil de-aeration system, kinetic energy of the oil-venting air (O) is increased to a static pressure which exceeds the exhaust-gas flow (A) pressure by a diffuser and the oil-venting air is then mixed with the exhaust-gas flow and discharged with the latter. The venting line (10) coming from the lubricating oil de-aeration system issues into a diffuser (13) which is integrated into the exhaust cone (9) enveloped by the exhaust-gas flow of the engine and whose oil-air outlet opening (14) is connected to the exhaust-gas flow either directly or via an attenuation chamber (18) provided in the exhaust cone. Provision is such made for discharging oil air from the engine to the atmosphere without contaminating visible engine parts and for obtaining a weight reduction due to the reduced length of the venting line.

20 Claims, 2 Drawing Sheets

(56) References Cited

U.S. PATENT DOCUMENTS

Figure 1:
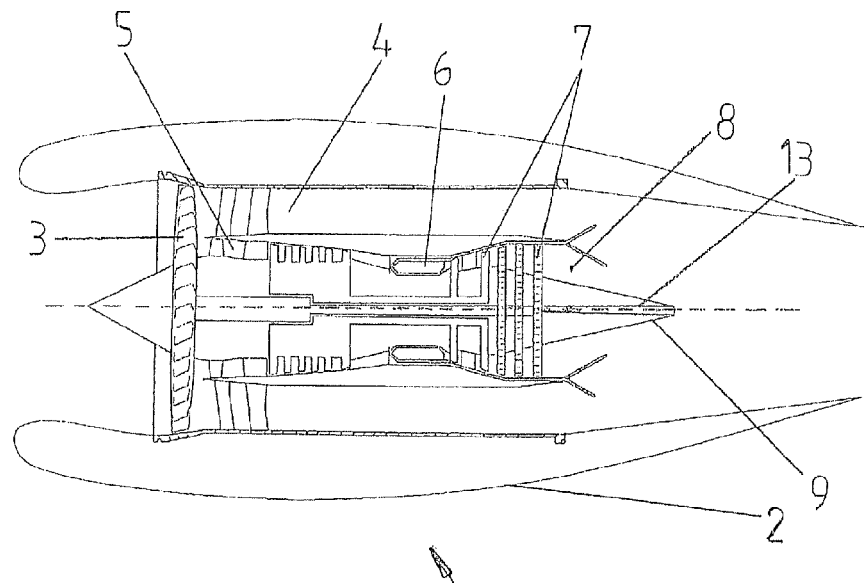

| | | | |
|---|---|---|---|
| 3,884,041 A * | 5/1975 | Zerlauth | 60/657 |
| 3,976,165 A * | 8/1976 | Pilarczyk | 184/6.16 |
| 4,156,342 A * | 5/1979 | Korta et al. | 60/39.08 |
| 4,755,103 A * | 7/1988 | Streifinger | 415/111 |
| 6,120,245 A * | 9/2000 | Uematsu et al. | 415/180 |
| 6,257,834 B1 * | 7/2001 | Bremer et al. | 417/53 |
| 6,578,363 B2 * | 6/2003 | Hashimoto et al. | 60/806 |
| 7,377,098 B2 * | 5/2008 | Walker et al. | 60/39.08 |
| 7,690,184 B2 * | 4/2010 | Gauthier et al. | 60/39.08 |
| 7,891,195 B2 * | 2/2011 | Bouty et al. | 60/770 |
| 8,051,952 B2 * | 11/2011 | Bart et al. | 184/6.11 |
| 8,235,647 B2 * | 8/2012 | Pisseloup et al. | 415/13 |
| 8,640,436 B2 * | 2/2014 | Thies | 60/39.08 |
| 2002/0141862 A1 * | 10/2002 | McEwen | 415/111 |
| 2008/0173002 A1 | 7/2008 | Gauthier et al. | |
| 2010/0143094 A1 | 6/2010 | Pisseloup et al. | |
| 2011/0188992 A1 * | 8/2011 | Fintescu et al. | 415/107 |

FOREIGN PATENT DOCUMENTS

| | | |
|---|---|---|
| DE | 102007058953 | 6/2009 |
| EP | 0234439 | 9/1987 |
| EP | 1843032 | 10/2007 |
| EP | 1878894 | 1/2008 |
| EP | 2067963 | 6/2009 |
| EP | 2085579 | 8/2009 |
| FR | 2929325 | 10/2009 |

OTHER PUBLICATIONS

German Search Report dated Sep. 1, 2011 for counterpart German patent application.

* cited by examiner

ARRANGEMENT FOR THE DISCHARGE OF OIL-VENTING AIR ON A GAS-TURBINE ENGINE

This application claims priority to German Patent Application DE102009059019.6 filed Dec. 21, 2009, the entirety of which is incorporated by reference herein.

This invention relates to an arrangement for the discharge of oil-venting air on a gas-turbine engine, with the air being separated by a lubricating oil de-aeration system and led to the atmosphere via venting lines.

In the bearing housings of gas-turbine engines, the lubricating oil mixes with sealing air which, as is generally known, is separated from the lubricating oil returned to the oil tank by a lubricating oil de-aeration system and discharged to the atmosphere via a venting line and a venting port issuing at the outside of the engine fairing or the fairing of the engine mounting arrangement. However, the discharged oil-venting air (oil air) still contains oil particles which lead to considerable contamination of the fairing of the engine or the engine mounting arrangement, with this contamination being aggravated even more by adhering dirt and dust particles. Such contamination is aesthetically undesirable and, when burnt into the fairing by the high engine temperature, can only be removed by costly cleaning measures. The known proposals for the solution of this problem are aimed at discharging the oil-contaminated oil-venting air at a position as remote as possible from the surface of the fairing to avoid contact of the oil air with the surface of the fairing. Such an arrangement and configuration of the oil-air outlet openings, which must also be aerodynamically faired because of in-flight air drag, is disadvantageous in that it incurs high investment and an increase in weight due to the long venting lines.

A broad aspect of the present invention is to provide an arrangement for the discharge of oil-venting air on a gas-turbine engine, with the air being separated by a lubricating oil de-aeration system and led to the atmosphere via venting lines, in such a way that the oil air is safely and with reduced investment discharged to the environment without contacting visible engine parts.

With an arrangement for the discharge of oil-venting air of the type specified above, the underlying idea of the present invention is to increase the kinetic energy of the oil-venting air to a static pressure above the pressure of the exhaust-gas flow by use of a diffuser, with the oil-venting air being then mixed with the exhaust-gas flow and discharged with the latter. The venting line coming from the lubricating oil de-aeration system issues into a diffuser which is integrated into the exhaust cone enveloped by the engine exhaust-gas flow and whose large oil-air outlet opening is connected to the exhaust-gas flow either directly or via an attenuation chamber provided in the exhaust cone. Provision is such made for discharging oil air from the engine to the atmosphere without contaminating visible engine parts. The reduced length of the venting line, which already ends in the exhaust cone of the engine, enables a considerable weight reduction to be obtained.

In development of the present invention, the oil-air outlet opening of the diffuser issues at the downstream side of the exhaust cone immediately into the exhaust-gas flow, i.e. the diffuser axially extends through the exhaust cone.

In a further development of the present invention the oil-air outlet opening of the diffuser issues into a large attenuation chamber confined by a rear wall and the entire outer wall of the exhaust cone. At least one oil-air outlet opening is provided in the outer wall of the exhaust cone at a position favorable for mixing the oil-venting air with the exhaust-gas flow (A).

In a further embodiment of the present invention, the oil-air outlet opening of the diffuser issues into a small attenuation chamber which is confined by a separating wall adjoining the periphery of the diffuser and the downstream portion of the outer wall of the exhaust cone, with at least one oil-air outlet opening being provided in this portion of the outer wall at a position favorable for mixing the oil-venting air with the exhaust-gas flow.

The present invention is more fully described in light of the accompanying drawings, showing a preferred embodiment. In the drawings, FIG. 1 is a schematic sectional view of a turbofan engine represented with an engine fairing, FIG. 2 is a partial view of the exhaust cone with a diffuser connected to the venting line and extending through the exhaust cone, FIG. 3 is a sectional view of the exhaust cone with internal diffuser issuing into a small attenuation chamber, and FIG. 4 is a sectional view of the exhaust cone, which as a whole forms an attenuation chamber for the oil air exiting from the diffuser.

Figure 2:
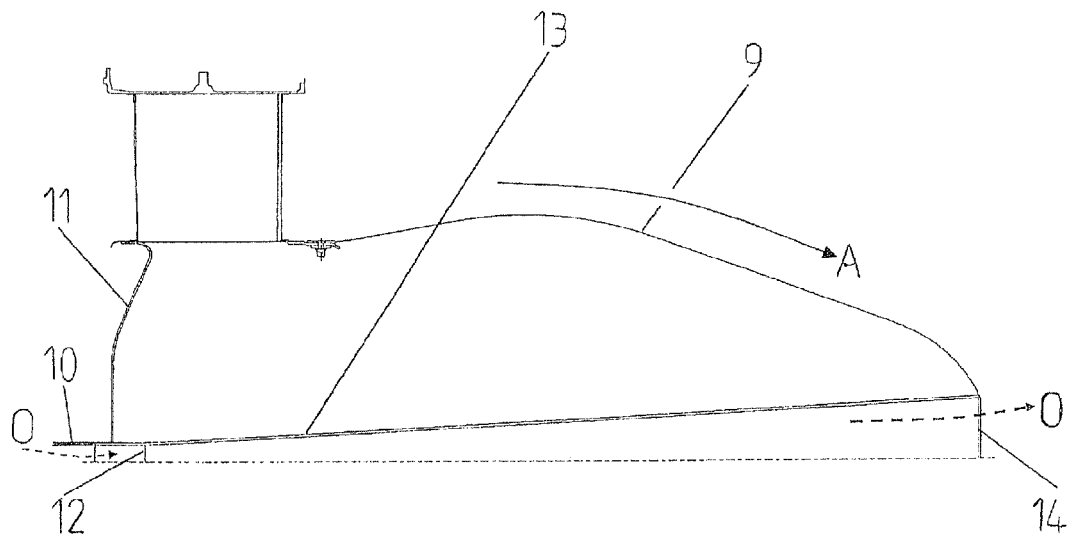

The turbofan engine 1 shown in FIG. 1 is enclosed by an engine fairing 2 at whose outer surface, in accordance with the state of the art, a venting line coming from the lubricating oil de-aeration system usually issues. The engine includes a bypass duct 4 disposed downstream of the fan 3 as well as a core-flow duct 5 transiting downstream of the combustion chamber 6 and the turbine 7 into an exhaust flow duct 8 which is inwardly confined by the exhaust cone 9.

The venting line 10 connected to the lubricating oil de-aeration system issues at the smaller oil-air inlet opening 12 provided in the rear wall 11 into a diffuser 13 which axially extends through the exhaust cone 9 and has a large oil-air outlet opening 14 at the rear—downstream—end of the exhaust cone 9. As the flow cross-section of the oil air in the diffuser 13 increases, the kinetic energy is converted into pressure energy, so that the static pressure of the oil air (oil-venting air) at the oil-air outlet opening 14 is larger than the exhaust-gas flow pressure. The oil air (arrowhead O) is therefore enabled to mix with the exhaust-gas flow (arrowhead A) and is discharged together with the latter, without leaving oil traces on any parts of the engine. Since the venting line 10 already ends at the rear wall 11 of the exhaust cone 9, it is significantly shorter than usual, so that engine weight is reduced overall.

Figure 3:
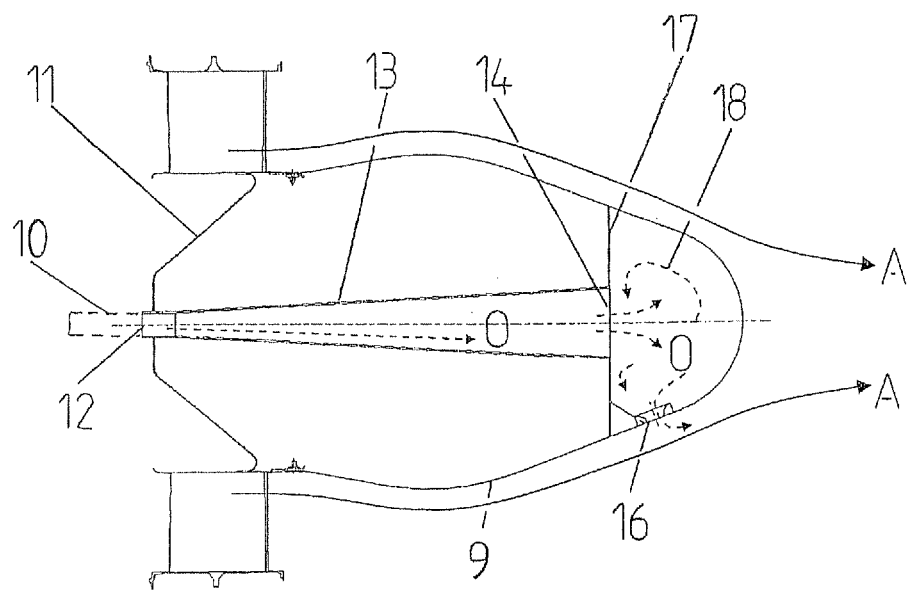
Figure 4:
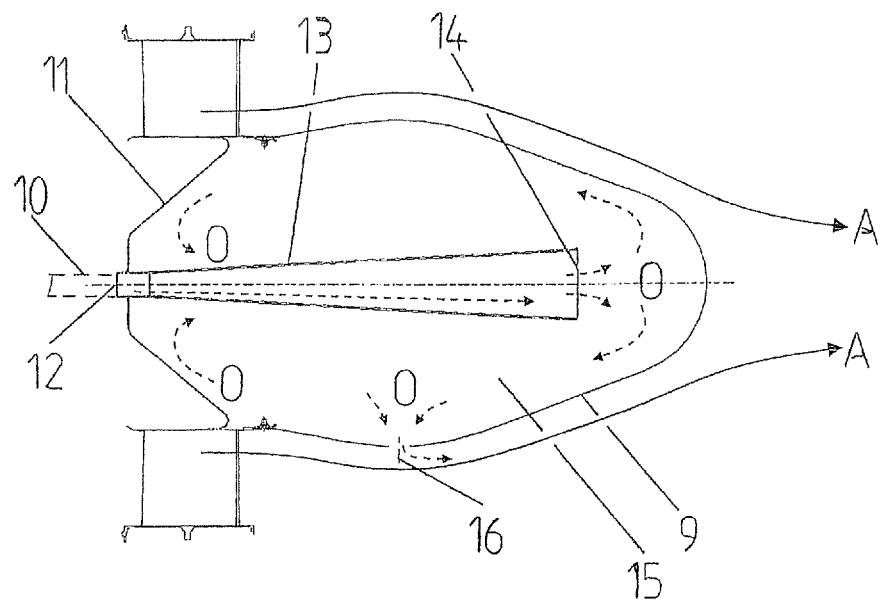

FIGS. 3 and 4 show two further embodiments of the arrangement for the discharge of oil air by a diffuser 13 whose oil-air outlet opening 14 is, however, situated within the exhaust cone 9. The cavity enclosed by the exhaust cone 9 and its rear wall 11 forms, as shown in FIG. 4, a large attenuation chamber 15 with an oil-air outlet opening 16 provided in the wall of the exhaust cone. As shown in FIG. 3, the oil-air outlet opening 14 of the diffuser 13 can also issue into a small attenuation chamber 18 which is formed by a separating wall 17 in the rearward area of the exhaust cone 9 and has an oil-air outlet opening 16 in the wall of the exhaust cone 9. Discharge of oil air (arrowhead O) via an attenuation chamber 15 or 18 is advantageous in that at least one oil-air outlet opening 16 can be arranged at a position in which optimum mixing of the oil air (arrowhead O) with the exhaust-gas flow (arrowhead A) is ensured. With the variants according to FIGS. 3 and 4 with an attenuation chamber 15 or 18, respectively, the oil-air outlet opening 14 of the diffuser 13 is protected against foreign objects accidentally left behind at this location, such as bolts or similar.

LIST OF REFERENCE NUMERALS

1 Turbofan engine
2 Engine fairing
3 Fan
4 Bypass duct
5 Core-flow duct
6 Combustion chamber
7 Turbine
8 Exhaust flow duct
9 Exhaust cone
10 Venting line
11 Rear wall
12 Oil-air inlet opening
13 Diffuser
14 Oil-air outlet opening
15 Large attenuation chamber
16 Oil-air outlet opening in 9
17 Separating wall
18 Small attenuation chamber

What is claimed is:

1. An arrangement for discharging oil-venting air separated by a lubricating oil de-aeration system of a gas-turbine engine, comprising:
a diffuser having an oil-air inlet opening for connecting to a venting line of the lubricating oil de-aeration system, the diffuser converting kinetic energy of the oil-venting air from the venting line to a static pressure energy which exceeds a pressure of exhaust gas flow through an exhaust flow duct of the gas-turbine engine, the diffuser positioned within an exhaust cone of the gas-turbine engine, the exhaust cone positioned within the exhaust flow duct to provide an internal confinement of the exhaust flow duct, the diffuser also having an oil-air outlet opening in communication with the exhaust gas flow for discharging the oil-venting air into the exhaust gas flow; the diffuser having an internal passage connecting the oil-air inlet opening with the oil-air outlet opening for passage of the oil-venting air from the oil-air inlet opening to the oil-air outlet opening, the internal passage having a cross-sectional area increasing from the oil-air inlet opening to the oil-air outlet opening.

2. The arrangement of claim 1, wherein the oil-air outlet opening of the diffuser issues directly into the exhaust gas flow at a downstream end of the exhaust cone.

3. The arrangement of claim 1, and further comprising:
an attenuation chamber formed between a wall of the exhaust cone, a rear wall of the engine and a wall of the diffuser; and
an outlet opening open to the exhaust gas flow provided in the wall of the exhaust cone at a position upstream of both a downstream-most portion of the exhaust cone and the oil-air outlet opening for mixing the oil-venting air with the exhaust gas flow;
wherein, the oil-air outlet opening of the diffuser issues into the attenuation chamber such that the oil-venting air first issues into the attenuation chamber and then into the exhaust gas flow through the outlet opening provided in the wall of the exhaust cone.

4. The arrangement of claim 1, and further comprising:
an attenuation chamber formed between a separating wall adjoining a wall of the diffuser and a downstream portion of a wall of the exhaust cone; and
an outlet opening open to the exhaust gas flow provided in the downstream portion of the wall of the exhaust cone at a position upstream of a downstream-most portion of the exhaust cone and downstream of the oil-air outlet opening for mixing the oil-venting air with the exhaust gas flow;
wherein, the oil-air outlet opening of the diffuser issues into the attenuation chamber such that the oil-venting air first issues into the attenuation chamber and then into the exhaust gas flow through the outlet opening provided in the downstream portion of the wall of the exhaust cone.

5. The arrangement of claim 4, wherein the cross-sectional area of the internal passage increases continuously from the oil-air inlet opening to the oil-air outlet opening.

6. The arrangement of claim 5, wherein the diffuser has a generally conical shape from the oil-air inlet opening to the oil-air outlet opening.

7. The arrangement of claim 1, wherein the cross-sectional area of the internal passage increases continuously from the oil-air inlet opening to the oil-air outlet opening.

8. The arrangement of claim 7, wherein the diffuser has a generally conical shape from the oil-air inlet opening to the oil-air outlet opening.

9. The arrangement of claim 2, wherein the cross-sectional area of the internal passage increases continuously from the oil-air inlet opening to the oil-air outlet opening.

10. The arrangement of claim 9, wherein the diffuser has a generally conical shape from the oil-air inlet opening to the oil-air outlet opening.

11. The arrangement of claim 3, wherein cross-sectional area of the internal passage increases continuously from the oil-air inlet opening to the oil-air outlet opening.

12. The arrangement of claim 11, wherein the diffuser has a generally conical shape from the oil-air inlet opening to the oil-air outlet opening.

13. The arrangement of claim 1, wherein the diffuser has a generally conical shape.

14. The arrangement of claim 2, wherein the diffuser has a generally conical shape.

15. The arrangement of claim 3, wherein the diffuser has a generally conical shape.

16. The arrangement of claim 4, wherein the diffuser has a generally conical shape.

17. The arrangement of claim 1, wherein the oil-air outlet opening has a largest cross-sectional area of the internal passage.

18. The arrangement of claim 2, wherein the oil-air outlet opening has a largest cross-sectional area of the internal passage.

19. The arrangement of claim 3, wherein the oil-air outlet opening has a largest cross-sectional area of the internal passage.

20. The arrangement of claim 4, wherein the oil-air outlet opening has a largest cross-sectional area of the internal passage.

* * * * *